US008645474B2

(12) United States Patent
Holmes et al.

(10) Patent No.: US 8,645,474 B2
(45) Date of Patent: Feb. 4, 2014

(54) SELF-DESCRIBED RENDERING OF DATA

(75) Inventors: John S Holmes, Seattle, WA (US); John T. Spivey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1302 days.

(21) Appl. No.: 12/040,548

(22) Filed: Feb. 29, 2008

(65) Prior Publication Data

US 2009/0222516 A1    Sep. 3, 2009

(51) Int. Cl.
*G06F 15/16*    (2006.01)
*G06F 15/173*    (2006.01)

(52) U.S. Cl.
USPC ............ 709/206; 709/204; 709/207; 709/217

(58) Field of Classification Search
USPC .......... 709/203, 204–207, 217, 223; 455/419, 455/446, 466
See application file for complete search history.

(56) References Cited

U.S. PATENT DOCUMENTS

| 6,343,287 | B1 * | 1/2002 | Kumar et al. ...................... 707/4 |
| 6,771,991 | B1 | 8/2004 | Gupta et al. |
| 7,016,978 | B2 | 3/2006 | Malik et al. |
| 7,219,303 | B2 * | 5/2007 | Fish ............................... 715/753 |
| 2002/0087704 | A1 | 7/2002 | Chesnais et al. |
| 2003/0225848 | A1 | 12/2003 | Heikes et al. |
| 2005/0108387 | A1 | 5/2005 | Li et al. |
| 2006/0173959 | A1 | 8/2006 | McKelvie et al. |
| 2006/0194596 | A1 | 8/2006 | Deng |
| 2006/0239234 | A1 | 10/2006 | Rao et al. |
| 2007/0150941 | A1 * | 6/2007 | Jachner ............................. 726/5 |
| 2007/0162228 | A1 | 7/2007 | Mitchell |
| 2007/0168490 | A1 * | 7/2007 | Kent et al. ...................... 709/223 |
| 2007/0198674 | A1 | 8/2007 | Li et al. |
| 2008/0082627 | A1 * | 4/2008 | Allen et al. .................... 709/217 |
| 2008/0091606 | A1 * | 4/2008 | Grecia ............................. 705/51 |
| 2008/0126475 | A1 * | 5/2008 | Morris ........................... 709/203 |

FOREIGN PATENT DOCUMENTS

| EP | 1701512 A1 | 9/2006 |
| KR | 20060036332 A | 4/2006 |
| KR | 20070114529 A | 12/2007 |

OTHER PUBLICATIONS

The Chinese Office Action mailed Jun. 7, 2013 for Chinese patent application No. 200980107123.2, a counterpart foreign application of U.S. Appl. No. 12/040,548, 6 pages.
The Chinese Office Action mailed Oct. 26, 2012 for Chinese patent application No. 200980107123.2, a counterpart foreign application of U.S. Appl. No. 12/040,548, 10 pages.
Book, et al., "An Instant Message-Driven User Interface Framework for Thin Client Applications", available at least as early as Aug. 8, 2007, at <<http://ebus.informatik.uni-leipzig.de/papers/paperuploads/An_Instant_Message-Driven_User_Interface_Framework_for_Thin_Client_ApplicationsMatthias_Book_Volker_Gruhn_Gerald_Muecke15542.pdf>>, pp. 4.

(Continued)

*Primary Examiner* — Saleh Najjar
*Assistant Examiner* — Feliciano Mejia
(74) *Attorney, Agent, or Firm* — Lee & Hayes, PLLC

(57) ABSTRACT

An exemplary data package for a network-based instant messaging system includes descriptive data about a user of the instant messaging system and data indicating a network location of a gadget to render the descriptive data, the location accessible by one or more other users of the instant messaging system. Various other exemplary methods, systems, device, etc., are also disclosed.

20 Claims, 13 Drawing Sheets

(56) References Cited

OTHER PUBLICATIONS

Greene, et al., "Instant Messaging & Presence Management in Mobile Ad-Hoc Networks", available at least as early as Aug. 8, 2007, at <<https://www.cs.tcd.ie/~omahony/MP2P_01_Greene_D.pdf>>, pp. 5.

Peddemors, et al., "Presence, Location and Instant Messaging in a Contextaware Application Framework", available at least as early as Aug. 8, 2007, at <<http://www.lab.telin.nl/~arjan/pub/mdm03-peddemors.pdf>>, pp. 6.

The Extended European Search Report mailed Mar. 6, 2013 for European patent application No. 09717652.3, 7 pages.

"Notice from the European Patent Office dated Oct. 1, 2007 concerning business methods", Official Journal of the European Patent Office, vol. 30, No. 11, Nov. 1, 2007, pp. 592-593.

* cited by examiner

SELF-DESCRIBED RENDERING OF DATA

BACKGROUND

The Internet is a global computer network that allows users to communicate with each other through various applications, such as, instant messaging. Various instant messaging (IM) systems are available that allow communication more akin to genuine conversations as compared to time delayed communications like email, Short Messaging Service (SMS), and so on. In addition, many IM systems include mechanisms that allow a user to display a "presence" status (e.g., online, offline, away, etc.).

An IM system known as WINDOWS® LIVE™ Messenger (Microsoft Corporation, Redmond, Wash.) includes a presence application programming interface (WINDOWS® LIVE™ presence API). This HTTP-based API returns a WINDOWS® LIVE™ Messenger user's presence using JavaScript™ Object Notation (JSON) (Sun Microsystems, Inc., Sunnyvale, Calif.) or an image. The WINDOWS® LIVE™ presence API can be used in conjunction with a control known as the WINDOWS® LIVE™ Messenger IM Control. A Web site can show a user's presence using the WINDOWS® LIVE™ presence API and let visitors send messages to the user with the WINDOWS® LIVE™ Messenger IM Control.

The WINDOWS® LIVE™ presence API allows an IM user to invite other IM users to provide permission to display their online presence. This is accomplished by adding a link to a signup page. When a user clicks the signup link, the user is taken to a WINDOWS® LIVE™ Messenger settings page. Once the signup is completed the user is directed back to the URL that was specified in the signup link. One can then use the user's ID to query for the user's online presence.

While user "presence" has become a basic feature of most IM systems, as users desire to share more information, some IM systems have developed mechanisms to extend presence with so-called "presence extensions". A presence extension may allow a user to provide additional information such as location or activity to a presence status. For example, for a user "Joe", a presence status and presence extension might indicate "busy" and "listening to James Brown". However, to date, the ability to readily share extended information is limited. As described herein, various exemplary methods, systems, devices, etc., allow people to share any of a variety of information in an IM environment.

SUMMARY

This summary is provided to introduce simplified concepts related to self-described rendering of data, which are further described below in the Detailed Description. This summary is not intended to identify essential features of the claimed subject matter, nor is it intended for use in determining the scope of the claimed subject matter.

An exemplary data package for a network-based instant messaging system includes descriptive data about a user of the instant messaging system and data indicating a network location of a gadget to render the descriptive data, the location accessible by one or more other users of the instant messaging system. Various other exemplary methods, systems, device, etc., are also disclosed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
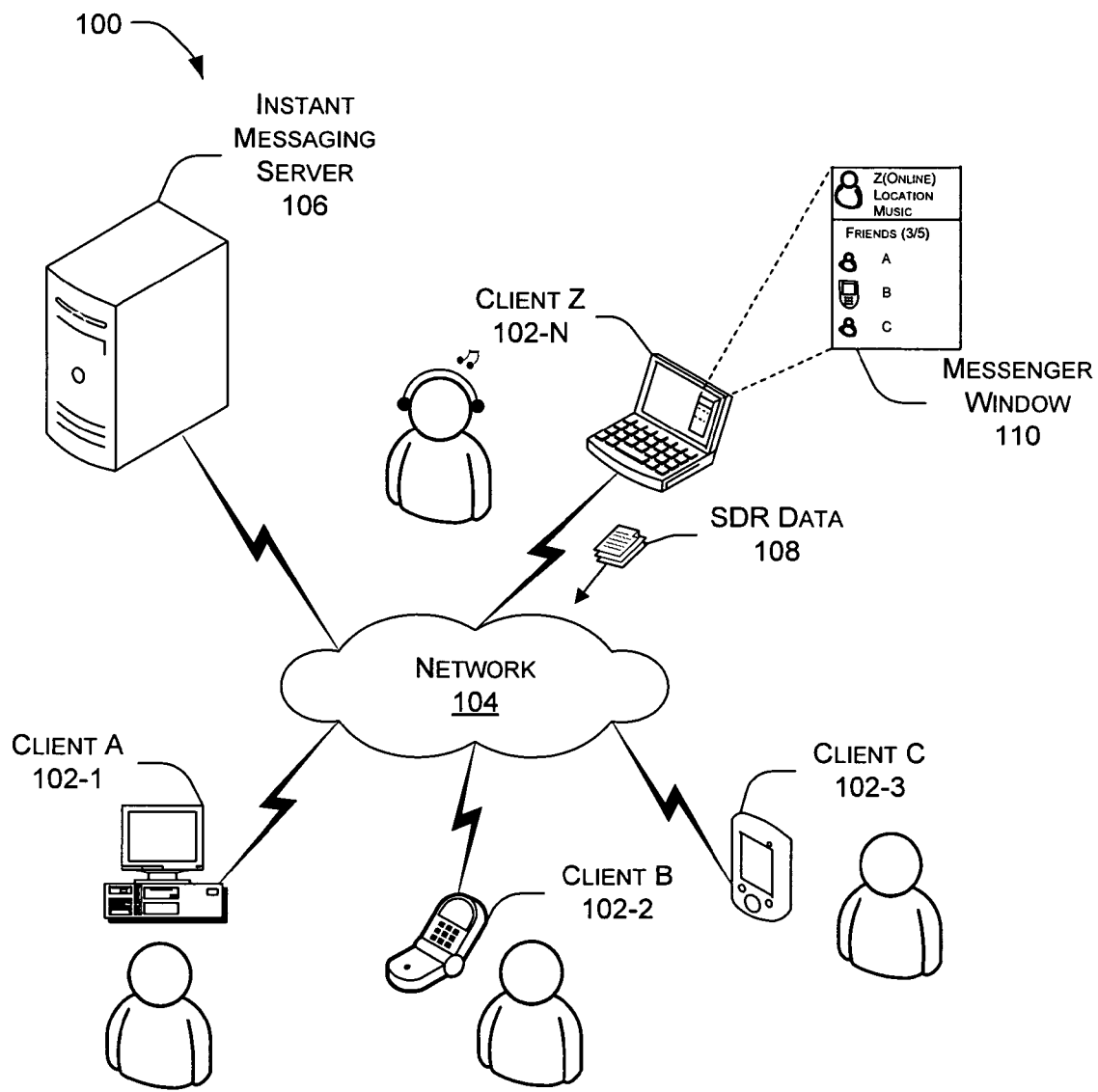
FIG. 1 illustrates an exemplary network environment for implementing self-described rendering of data.

Various exemplary methods, systems, devices, etc., described herein allow a user to readily share information in an IM environment. For example, an exemplary IM extension mechanism specifies a gadget to render the extension's content. In such an example, the gadget can be retrieved by the subscribed endpoint either peer-to-peer from the publishing endpoint or from a Web server. The information the gadget renders may be contained in a presence document, which can be published to all subscribers. Consider an exemplary location extension that allows a user to indicate a geographical location. Such an extension can specify a gadget that is a mash-up with a mapping application (e.g., VIRTUAL EARTH®) and can render the user's location on a map. Once rendered, IM contacts can perform tasks such as searching nearby businesses, planning routes to the located user, etc. In a simple form, a gadget is an HTML file and an XML definition file. Often gadgets include other files such as image files (e.g., PNG, JPG, etc.), style sheets (e.g., CSS, etc.) and scripting (e.g., JavaScript source files, VBScript source files, etc.). A gadget may be distributed as a compressed file (e.g., a zip file, etc.).

An exemplary presence extension and accompanying gadget could also be injected entirely by a Web server. For example, a Web server operated by a merchandiser could (e.g., using web services) instruct an IM server to inject a wish list into a user's presence (e.g., with the user's permission) along with a gadget to display the wished for items. In this example, all of the contacts of the user can see what the user wants for a holiday (e.g., Christmas, birthday, Hanukah, Diwali, Kwanzaa, etc.) and buy a gift without having to take the step of first going to the merchandiser's Web site and looking up the user's wish list.

As described herein, an exemplary presence extension can specify a richly rendered format for display of information that does not require the extension to be installed on the rendering endpoint. An exemplary method can include consuming presence information in a gadget. An exemplary method can include sending a gadget peer-to-peer.

Various described techniques for self-described rendering of data enable sharing of additional information in an IM environment. A user may provide his/her additional information to be shared with contacts connected to the user through an IM system as part of a self-described rendering mechanism (SDR). An exemplary SDR mechanism includes providing content and information about a gadget to render the content. Thus, other users or contacts receive not only the content (e.g., something other than mere presence status), but also information regarding how the content can be rendered.

As described herein a presence extension provides for adding presence information to a presence document (e.g., a document that includes presence information for a user). Presence information is typically information of or pertaining to a user that the user can publish to one or more contacts in an IM environment. Instructions or code for an IM system may be referred to as 1st party and, as mentioned, most IM systems include code for communication and display of presence information. Code for communication and display of extended information may be code from a 2nd party or a 3rd party.

In an exemplary method, a presence extension can be described by a payload written in an extensible language (e.g., XML). For example, for a GPS presence extension, it could contain <presence_extension name="GPS" gadget="http://foo.com/gps.gadget"> <locationlatitude="39" longitude="147"/> </presence_extension>. The extended presence data in this example is the latitude and longitude information and all of a user's contacts may receive it. But without some type of custom code on their computing devices, the contacts may be simply limited to displaying the XML, which does not particularly enhance the users' IM experience. However, the exemplary presence extension specifies a gadget that enables contacts (e.g., subscribing users) to have a richer user experience (e.g., by displaying much richer data).

In the foregoing example, the "gps.gadget" specifies a file that may be a zip or cab archive similar to a WINDOWS® VISTA® operating system sidebar gadget. Such a file can contain HTML, CSS, and JavaScript code laid out according to a pre-defined format. At a receiving end, a contact's computing device can download the gadget and host it in, for example, MSHTML, WebKit, etc. The contact's computing device can then inject an object model into this hosting environment that contains the extended information (e.g., the location information in XML). Upon execution, the HTML can show, for example, a VIRTUAL EARTH® map of the location of the associated user with a pushpin graphic at the exact spot where the user is located.

As described herein, a user can generate an exemplary presence extension that includes a description for a gadget (e.g., code) that can be used to render the extended information; accordingly, the presence extension becomes "self rendering". On the consuming side, a contact's computing device hosts the specified gadget (e.g., in MSHTML) and injects the extended presence information into the hosted gadget to render the specific extended presence information of originating user. In the description that follows, the foregoing process is referred to generally as self-described rendering of data, for example, in an IM environment.

Exemplary Network Environment

FIG. 1 illustrates an exemplary computing environment 100 for self-described rendering of data, which may implement techniques described herein, and which may be representative, in whole or in part, of elements described herein. The computing environment 100 is an example of a computing environment that is not intended to suggest any limitation to the scope of use and/or functionality of the computer and network architectures used.

The computing environment 100 includes a plurality of client devices 102-1, 102-2, 102-3, ..., 102-N (collectively referred to as the clients 102). The clients 102 are communicatively connected through a network 104 with an instant messaging server 106. The clients 102 may be implemented as any of a variety of conventional computing devices, for example, a desktop PC, a notebook or a portable computer, a Personal Digital Assistant (PDA), a cell phone with appropriate software/hardware, a workstation, a mobile computing device, or an Internet appliance, etc.

The network 104 can be a wireless or a wired network, or a combination thereof. The network 104 can also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

The instant messaging (IM) server 106 can be, for example, a general purpose computing device, a server, a cluster of servers and mainframes. The IM server 106 can receive queries from the clients 102 over the network 104. The IM server 106 provides a mechanism for enabling communication between two or more of the clients 102 based on various instant messaging protocols known in the art. The exchange of communication between the various clients 102 can be implemented through written text based mechanisms.

The communication exchange may also be accompanied with the exchange of additional information associated with the user. Such additional information or extended information is packaged as self-described rendering (SDR) data 108. As mentioned, such data includes extended information and information about how to render the extended information. Extended information may include information about the geographical location of the clients 102 that are communicating with each other, information related to multimedia content the client 102 is playing, and other information that may be specific to the clients 102. Such information may be displayed in a graphical user interface (GUI) like a messenger window 110 in an instant messaging (IM) system.

The rendering information included in the SDR data 108 may be utilized for rendering a user's extended information on the computing devices of other clients 102. In one implementation, extended information may be maintained locally at one or more of the clients 102 or at the IM server 106 and may be written in and implemented using Extensible Markup Language (XML).

As described herein, the SDR data 108 may be referred to as a data package. For example, the SDR data 108 may be a data package for a network-based instant messaging system where the data package includes descriptive data (e.g., extended information) about a user of the instant messaging system and data indicating a network location of a gadget to render the descriptive data, the location accessible by one or more other users of the instant messaging system. With respect to the network location, such a location may be specified using HTTP, a domain name, an Internet Protocol (IP) address or other technique or convention. In general, the gadget is available via, or as, a resource on a network (e.g., an IM server).

In various examples, descriptive data about a user of an instant messaging system includes data about merchandise. Similarly, data indicating a network location of a gadget may include a domain name or an Internet Protocol address of a merchandiser.

An exemplary timeline 112 illustrates the various steps for self-described rendering of data at one or more of the clients 102. In one embodiment, the user of the client 102-N, referred to as IM client Z, may be willing to share extended information with other users, say client 102-1 (IM client A), client 102-2 (IM client B) and client 102-3 (IM client C). Examples of such extended information includes information related to one or more multimedia files being played by the IM client Z, depicted by an instance T1 in the timeline 112. The general information related to the IM client Z, say availability or presence status and the like, may be manifest to the other clients 102, namely IM clients A, B and C through their messenger window 110. The messenger window 110 may also indicate the presence and/or availability status of the IM clients A, B, and C to the IM client Z. It would be appreciated that the availability status of only those clients who are known to the IM client Z would be visible to the IM client Z. This is depicted by an instance T2 on the timeline 112.

To implement self-described rendering of data, the IM client Z sends extended information as SDR data 108 to the IM clients A, B, and C. The SDR data 108 associated with the IM client Z is received by the IM clients A, B, and C through the IM server 106. This is depicted by an instance T3 on the timeline 112. As indicated previously, the SDR data 108 includes extended information and rendering information. In this case, the extended information specifies information associated with the IM client Z and the rendering information includes data for determining the manner in which the extended information may be rendered at the IM clients A, B, and C. At an instance T4 on the timeline 112, one or more agents may acquire an instruction code (e.g., a gadget) for rendering the extended information in conformance with the accompanying rendering information. The instruction code can be acquired by the IM clients A, B, and C from an external storage media, like a disk-drive, or from a network, say over the Internet.

Once the instruction code is acquired by the IM clients A, B and C, the extended information associated with the IM client Z is rendered in conformance with the rendering information included within the SDR data 108. The manner in which the extended information can be utilized for self-described rendering of data is further described in greater detail in conjunction with FIG. 2

Exemplary Computing Device

Figure 2:
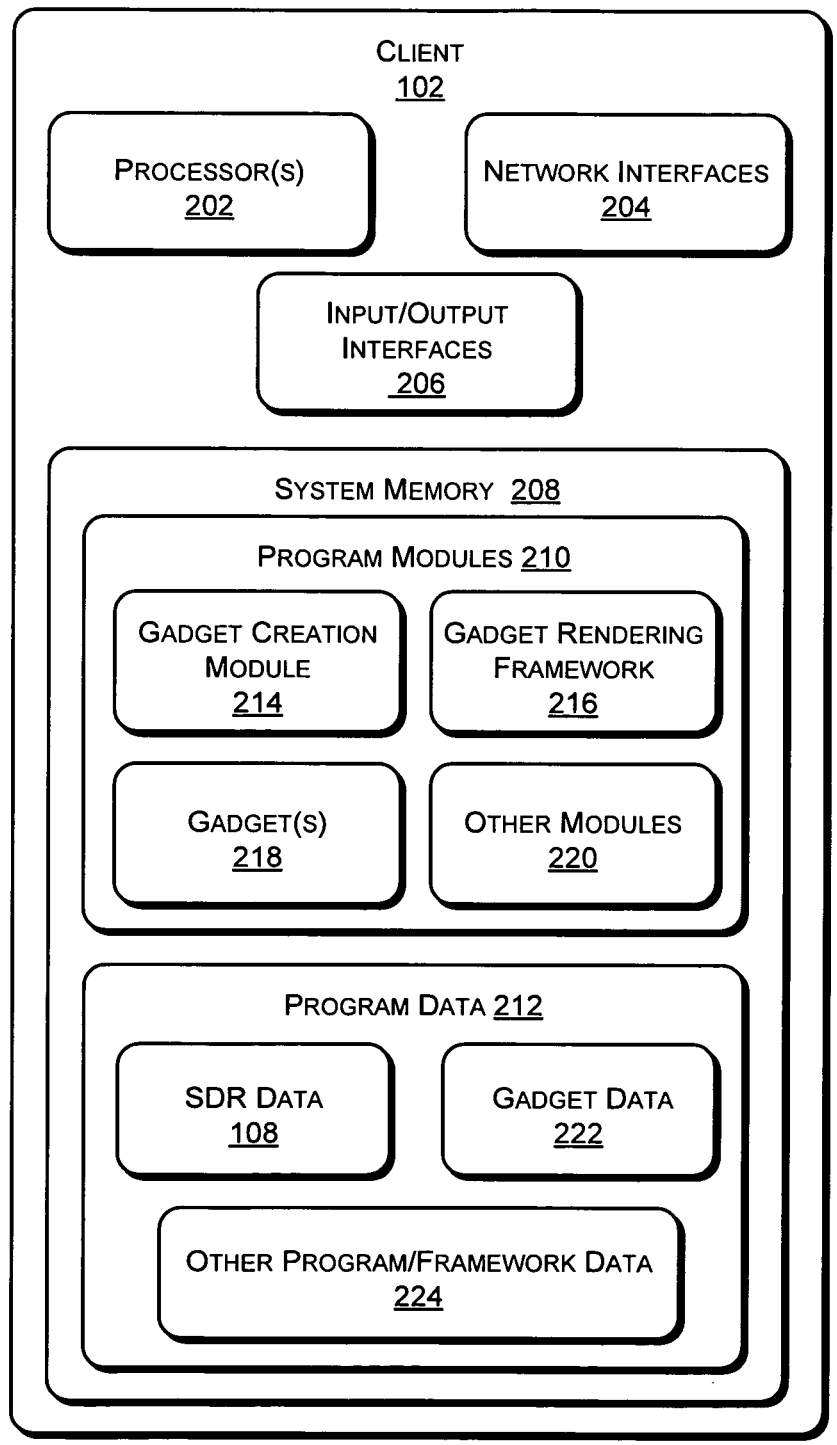
FIG. 2 illustrates an exemplary computing device for implementing self-described rendering of data.

FIG. 2 is an exemplary computing device for implementing various techniques for self-described rendering of data. The computing device can be a client 102 that includes a processor 202, network interfaces 204, input/output interfaces 206, and system memory 208. The network interfaces 204 facilitate communication between the clients 102 connected over the network 104. Furthermore, the network interfaces 204 may include one or more ports for connecting a number of computing devices like the clients 102 to each other or to a server like the IM server 106. The network interfaces 204 can facilitate communications within a wide variety of networks and protocol types, including wired networks (e.g. LAN, cable, etc.) and wireless networks (e.g. WLAN, cellular, satellite, etc.).

The input/output interfaces 206 may include logical ports that enable receiving input from one or more of the clients 102. Examples of input/output interfaces 206 include, but are not limited to a scanner port, a mouse port, a keyboard port, and so on. In the present implementation, the input/output interfaces 206 enable exchange of information, such as, the status and other additional information between two or more of the clients 102.

The system memory 208 can be any computer-readable media in the form of both volatile memory, such as Random Access Memory (RAM) and/or non-volatile memory, such as Read Only Memory (ROM) or flash RAM. The system memory 208 (interchangeably referred to as memory 208) typically includes data and/or program modules being immediately accessible to and/or presently operated on by the processor 202. In the present implementation, the memory 208 includes program modules 210 and program data 212 for implementing techniques for self-described rendering of data. The program modules 210 may include a gadget creation module 214, a gadget rendering framework 216, a gadget(s) 218, and other modules 220. The program data 212 may store data including the SDR data 108, gadget data 222, and other program/framework data 224. The other program/framework data 224 may include data that may be generated as a result of the execution of one or more programs modules 210.

In one implementation, the gadget creation module 214 acquires the gadget data 222 at a publishing endpoint (e.g., one or more of the clients 102). In another implementation, the gadget creation module 214 can be configured to retrieve the gadget data 222 from a publishing endpoint where one or more gadgets are already created and stored. The SDR data 108 includes extended information about one or more of the clients 102, and rendering information that dictates the manner in which the rendering of the user information is to be performed. In the present implementation, the gadget data 222 may be implemented using Hyper Text Markup Language (HTML), JavaScript (JS), and Cascading Style Sheets (CSS) and can be stored at various sources including the IM server 106, and the client 102-N.

The rendering information may also specify a gadget, consider gadget(s) 218, for rendering user related information included in the gadget data 222. The gadget(s) 218 may be obtained from various sources, for example, the gadget(s) 218 can be downloaded from a network location or from a computer-readable media. In one implementation, the gadget(s) 218 can be created at one or more of the clients 102. In such an implementation, the gadget creation module 214 may create one or more gadget(s) 218 based on the SDR data 108 available from one or more of the clients 102 who are willing to share their related information with other clients 102 included in their friend's list.

As indicated previously, the SDR data 108 of one of the clients 102 is sent to other clients who are included in his/her friend or contact list. While this example sends to clients according to a "friend" or contact list, such information may be sent to any of a variety of entities (e.g., every client that meets some criterion or criteria). The SDR data 108 typically includes information pertinent to one or more of the clients 102 along with rendering information for rendering the user related information. Returning to the example, as illustrated in FIG. 1, the IM client Z sends the SDR data 108 to one or more clients (e.g., the IM clients A, B and C) over the network 104. The messenger window 110 at the IM client Z normally indicates the presence status of the IM clients A, B, and C. Moreover, the SDR data 108 of the IM client Z is received by one or more of the IM clients A, B, and C.

The gadget creation module 214 acquires the gadget data 222 from the SDR data 108 received from the IM client Z. In this example, the gadget data 222 includes extended information specific to the IM client Z, for example, multimedia files being played by the IM client Z, geographical location of the IM client Z, and so on. The gadget creation module 214 also acquires the rendering information included within the SDR data 108. The rendering information includes relevant details indicating various attributes of one or more applications (e.g., gadget(s) 218). Such attributes may include, for example, properties that identify the type of gadget(s) 218 that may be required for rendering gadget data 222 on devices of the IM clients A, B, and C, location from where the gadget(s) 218 can be obtained from, and so on. Based on these attributes, the gadget creation module 214 can acquire the gadget(s) 218 from either an externally or an internally available storage media. In one implementation, the gadget creation module 214 can create gadget(s) 218 based on the attributes associated with the gadget data 222.

The rendering of the gadget data 222, which includes extended information about the IM client Z, may be based on the rendering information included within the SDR data 108. The gadget(s) 218 may render the gadget data 222 based on the gadget rendering framework 216. The gadget rendering framework 216 may include set of program(s) or routine(s) that provide a foundation structure for executing the gadget(s) 218. Therefore, the gadget rendering framework 216 can provide a platform and various interfaces to render the gadget data 222 using gadget(s) 218 in conformance with the rendering information included within the SDR data 108. As described herein, an exemplary gadget rendering framework can provide a secure surface for rendering information, as opposed to just a general computing substrate. Once the rendering of the gadget data 222 is performed, the relevant output can be displayed. The rendered extended information may be displayed to other users through the user-interface (UI) of the messenger application of the IM clients A, B, and C.

Depending on the nature of the extended information, a gadget may generate a sound, a graphic, etc. Often extended information will be rendered graphically, for example, as a GUI. A GUI may further be capable of organizing personal applications like a calendar, a calculator, a stock ticker and a VoIP phone dialer. A GUI may display such applications on a side pane of a "desktop" to be accessed by users. The one or more other modules 220 may provide instructions to use presence information and/or extended information.

Exemplary API

Figure 3:
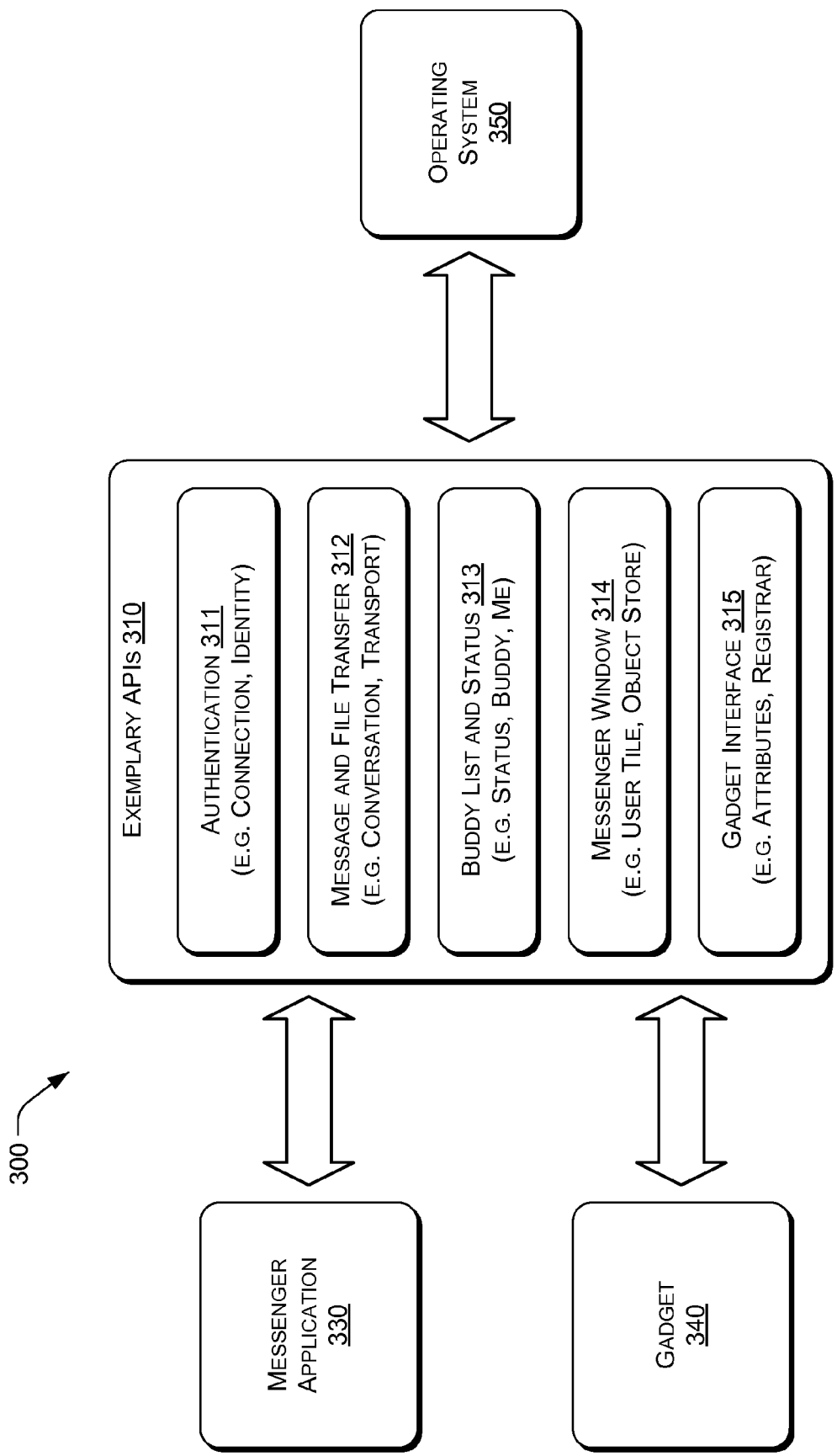
FIG. 3 illustrates an exemplary Application Program Interface (API) for use with a scheme for self-described rendering of data.

FIG. 3 illustrates an exemplary API scheme 300 for self-described rendering of data. The scheme 300 includes various exemplary APIs 310 that allow a messenger application 330 and a gadget 340 to cause an operating system 350 to perform particular actions. The APIs include an authentication API 311, a message and file transfer API 312, a buddy list (or contacts) and status API 313, a messenger window API 314 and a gadget interface API 315.

Figure 4:
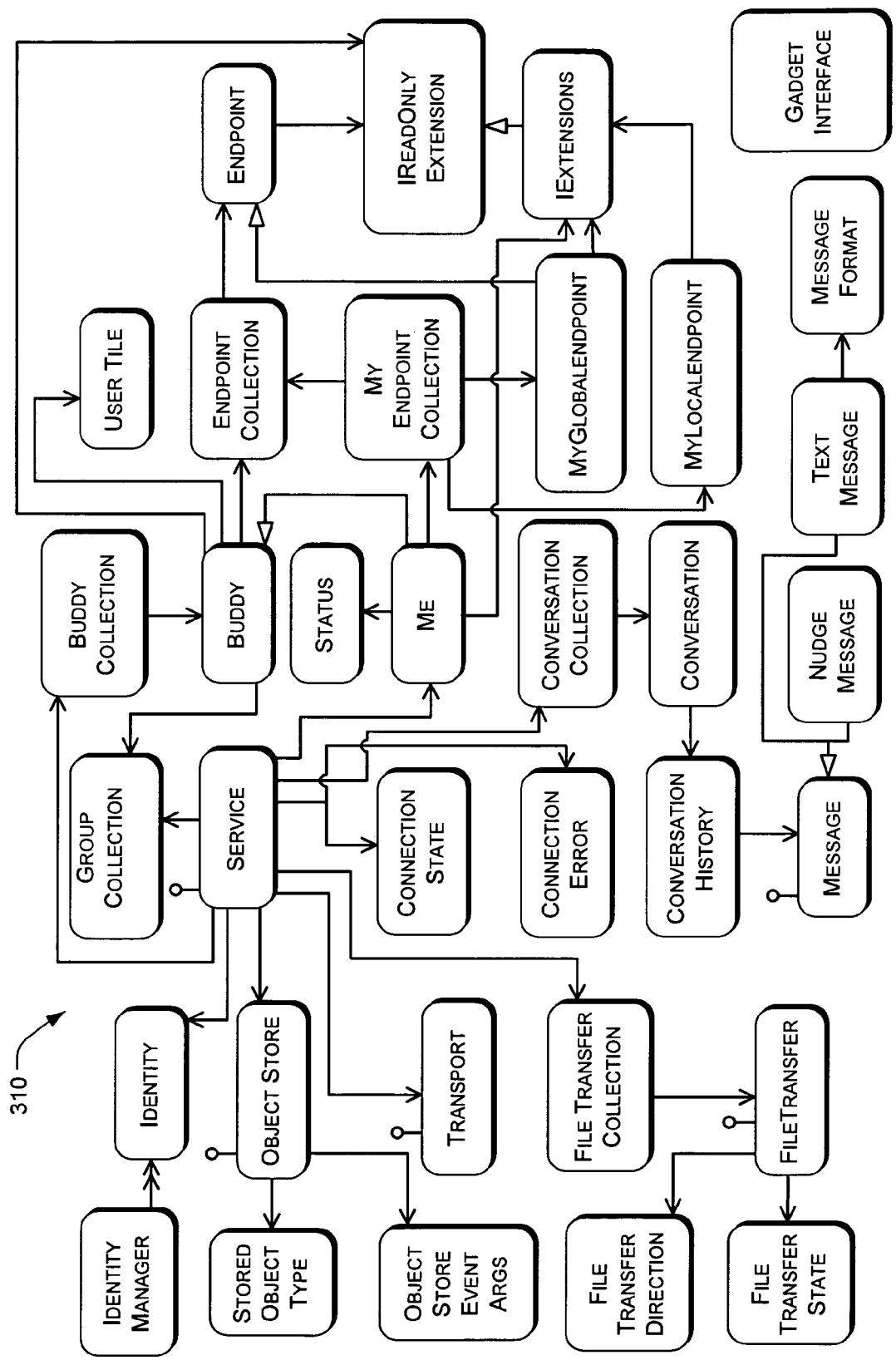
FIG. 4 illustrates an exemplary Application Program Interface (API) for use with a scheme for self-described rendering of data.

FIG. 4 illustrates exemplary APIs 310 for use in self-described rendering of data. The APIs 310 provide a rich variety of functionality for users to communicate extended information to buddies or contacts in an IM environment.

Figure 5:
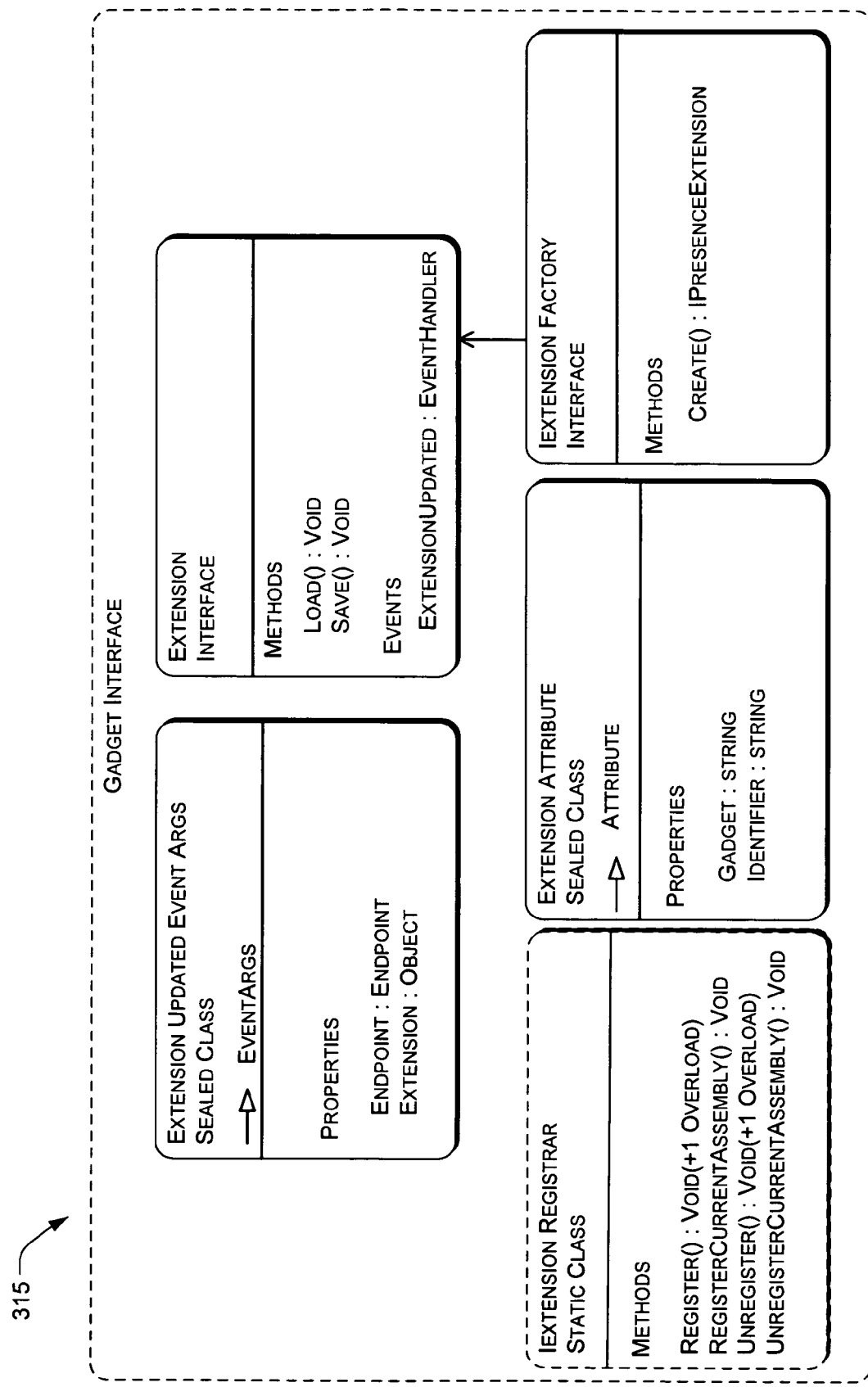
FIG. 5 illustrates an exemplary Application Program Interface (API) for use with a scheme for self-described rendering of data.

FIG. 5 illustrates the exemplary gadget interface API 315 of FIG. 3. The gadget interface API 315 specifies various properties, methods and events to facilitate self-described rendering of data in an IM environment.

Exemplary Implementations

Figure 6:
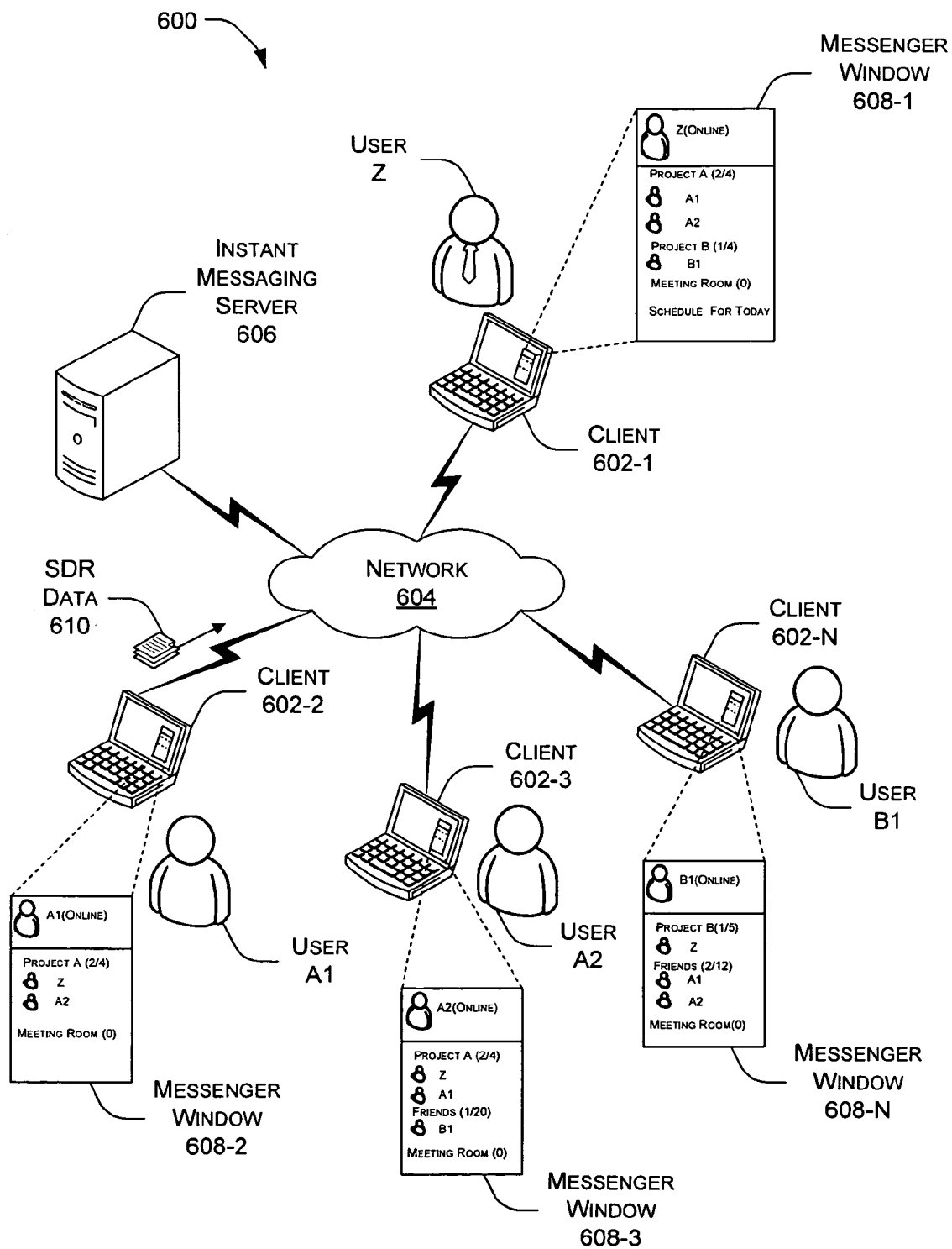
FIG. 6 illustrates an exemplary implementation of self-described rendering of data in a professional setup.

FIG. 6 illustrates an exemplary implementation 600 of self-described rendering of data in a professional setup, which can be used to implement techniques described herein, and which may be representative, in whole or in part, of elements described herein. A computing environment 600 is an example of a computing environment and is not intended to suggest any limitation to the scope of use and/or functionality of the computer and network architectures used.

The computing environment 600 includes a plurality of client devices 602-1, 602-2, 602-3, . . . , 602-N (collectively referred to as the clients 602) that are communicatively connected to each other through a network 604. The clients 602 may also be connected to an instant messaging server 606. The computing environment 600 and each of its elements may be implemented as broadly described above with respect to FIG. 1.

In one embodiment, the clients 602 can communicate with each other by exchanging text-based messages through applications based on instant messaging (or IM) protocols installed on each client 602. The exchanged messages (both received and sent) can be displayed through graphical user interface like messenger window 608-1, 2 . . . , N on each of the clients 602-1, 2, . . . , N respectively. In one implementation the computing environment 600 may be a professional set up, with the users associated with the clients 602 as colleagues, subordinates, managers, team/group leaders, and so as a part of the professional set up.

In the present implementation, the clients 602-1, 602-2, 602-3, and 602-N are referred to as users Z, A1, A2, and B1 respectively. Each of the users Z, A1, A2, and B1 may be capable of communicating with each other through one or more IM based applications. For example, user Z can be a manager Z supervising two projects say A and B involving the users namely users A1, A2, and B1. In the present example project A may involve user A1 and A2, and the project B involves user B1. The IM based applications allow manager Z to communicate with the users involved in the projects A and B, when they are logged in and appear online.

Manager Z can communicate with the users A1, A2, and B1 who are online, and also view additional information in relation to each of the user's schedule within the professional set-up. Examples of such additional information include but are not limited to list of tasks that may have been allotted to each of the user's, tasks completed by the user's, details of a meetings attended, and so on. Each of the users is associated with SDR data 610. The SDR data 610 can be made available to other users working on the same projects, or in some cases can be made available to all users who may be working on different projects.

In the example of FIG. 6, the SDR data 610 associated with users A1 may be made available to user A2, and vice versa. But the SDR data 610 associated with either of users A1 and A2 would not be available to user B1. However, the SDR data 610 associated with users A1, A2, and B1 can be made available to manager Z. As indicated previously, the SDR data 610 includes the gadget data (e.g., gadget data 222 of FIG. 2), associated with user A1, and rendering information providing details of one or more application (e.g., gadget(s) 218 of FIG. 2) that render the information.

Manager Z receives the SDR data 610 from one or more of the users A1, A2, and B1. A module (e.g., the gadget creation module 214 of FIG. 2), acquires the user gadget data from the SDR data 610. The gadget creation module can either acquire the relevant gadget(s) from an external source or may create gadget(s) based on the SDR data 610. The appropriate, specified gadget(s) renders the gadget data based on a rendering framework (e.g., the gadget rendering framework 216 of FIG. 2). The gadget rendering framework provides a platform and various interfaces to render the gadget data using the gadget(s) in conformance with the rendering information included within the SDR data 610.

Rendering of the gadget data of the SDR data 610 makes relevant output (i.e., the extended information about one or more of the users) visible (or audible, etc.) to manager Z and/or member A2, for example, through their messenger window 608-1 and 608-3, respectively. Such a scheme allows manager Z to view information associated with user A1, such as tasks the user may be working on, list of completed tasks, and so on. This may enable manager Z to control and regularize the work progressed by any one or more of users A1, A2, and B1.

Figure 7:
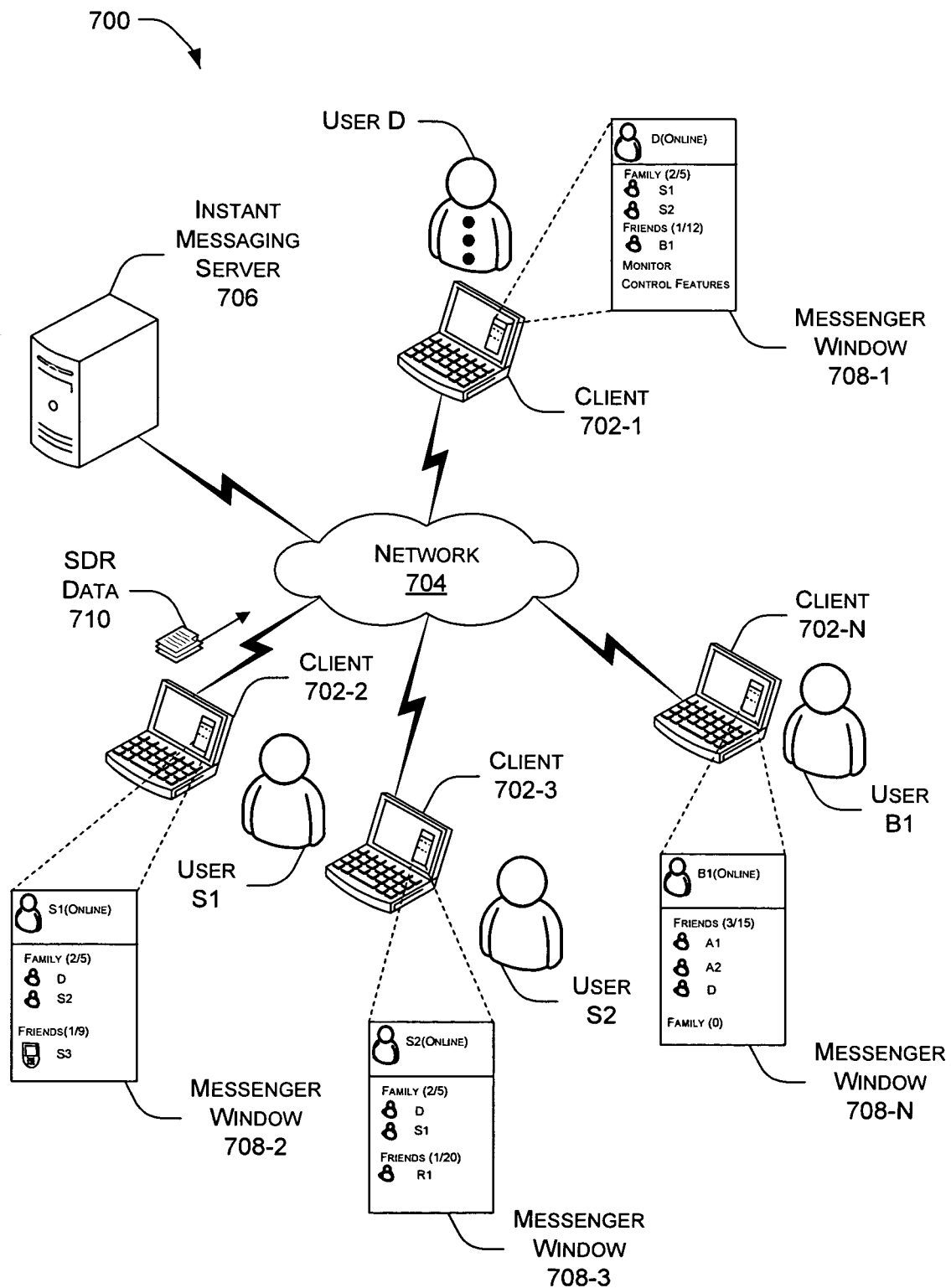
FIG. 7 illustrates an exemplary implementation of self-described rendering of data in a personal setup.

FIG. 7 illustrates an exemplary implementation of self-described rendering of data in a personal setup through techniques described herein, and which may be representative, in whole or in part, of elements described herein. A computing environment 700 is an example of a computing environment and is not intended to suggest any limitation to the scope of use and/or functionality of the computer and network architectures.

The computing environment 700 includes a plurality of client devices 702-1, 702-2, 702-3, . . . , 702-N (collectively referred to as the clients 702) that are communicatively connected through a network 704. The clients 702 may also be connected to an instant messaging server 706. The computing environment 700 and each of its elements may be implemented as broadly described above with respect to FIG. 1.

In one embodiment, the clients 702 can communicate with each other by exchanging text-based messages through applications based on instant messaging (or IM) protocols installed on each client 702. The exchanged messages can be displayed through graphical user interface like messenger window 708-1, 2, . . . , N on each of the clients 702-1, 2, . . . , N respectively. In one implementation, the computing environment 700 may be a personal set up, with the users associated with the clients 702 as family members, friends, relatives and so on.

In the example of FIG. 7, the clients 702-1, 702-2, 702-3, and 702-N are indicated as users D, S1, S2, and B1 respectively. Each of the users D, S1, S2, and B1 may be capable of communicating with each other through one or more IM based applications. For example, user D can be a parent communicating with his/her children, friends, relatives and so on namely users S1, S2, and B1. In the present example, the users S1 and S2 may be siblings and children of the parent and the user B1 is an acquaintance of the parent. The IM based applications allow the parent to communicate with the users S1, S2, and B1 when they are logged in and appear online.

The parent can communicate with the users S1, S2, and B1 and also view additional information related to each of the user's activities within their personal setup. Examples of such additional information include but are not limited to, a list of multimedia content being played by the users, the user's geographical location, and list of web pages visited by the user recently, and so on. Each of the users may be associated with a SDR data 710. The SDR data 710 can be made available to other users belonging to the same family, or in some cases can be made available to users who may be known to them. For example, the SDR data 710 associated with the siblings (i.e., users S1 and S2) may be available to each other but not to user B1. The data associated with the users S1 and S2 may not be made available to user B1 as they made be unknown to user B1. However, the siblings and user B1 may both be known to the parent, allowing their respective SDR data 710 to be made available to the parent.

As indicated previously, the SDR data 710 includes gadget data (e.g., the gadget data 222 of FIG. 2) to be consumed by a gadget (e.g., as associated with any of the users S1, S2, and B1) and rendering information providing details of one or more gadgets (e.g., the gadget(s) 218 of FIG. 2) that may be capable of rendering the user information. The parent receives the SDR data 710 from one or more of the users S1, S2, and B1. A module (e.g., the gadget creation module 214 of FIG. 2) may extract the user related information or extended information from the SDR data 710. In one implementation, a gadget creation module may either acquire the relevant gadget(s) from an external source or may allow for creation of gadget(s) (e.g., through user input). The gadget(s) renders the gadget data, for example, based on a gadget rendering framework (e.g., the gadget rendering framework 216 of FIG. 2).

The gadget rendering framework provides a platform and various interfaces to render the gadget data using the gadget(s) in conformance with the rendering information included within the SDR data 710. Rendering of the gadget data makes relevant output (i.e., extended information about one or more of the users) visible (or audible, etc.) to the parent and/or user S2 through their messenger window 708-1 and 708-3, respectively. Such a scheme allows the parent to view or hear information associated with user S1, such as multimedia content being played back by the user, a description of the user's geographical location and a list of web pages visited by the user recently. This may enable parent D to monitor and be aware of his/her children's activities and whereabouts through the additional information they obtain on the IM systems.

Figure 8:
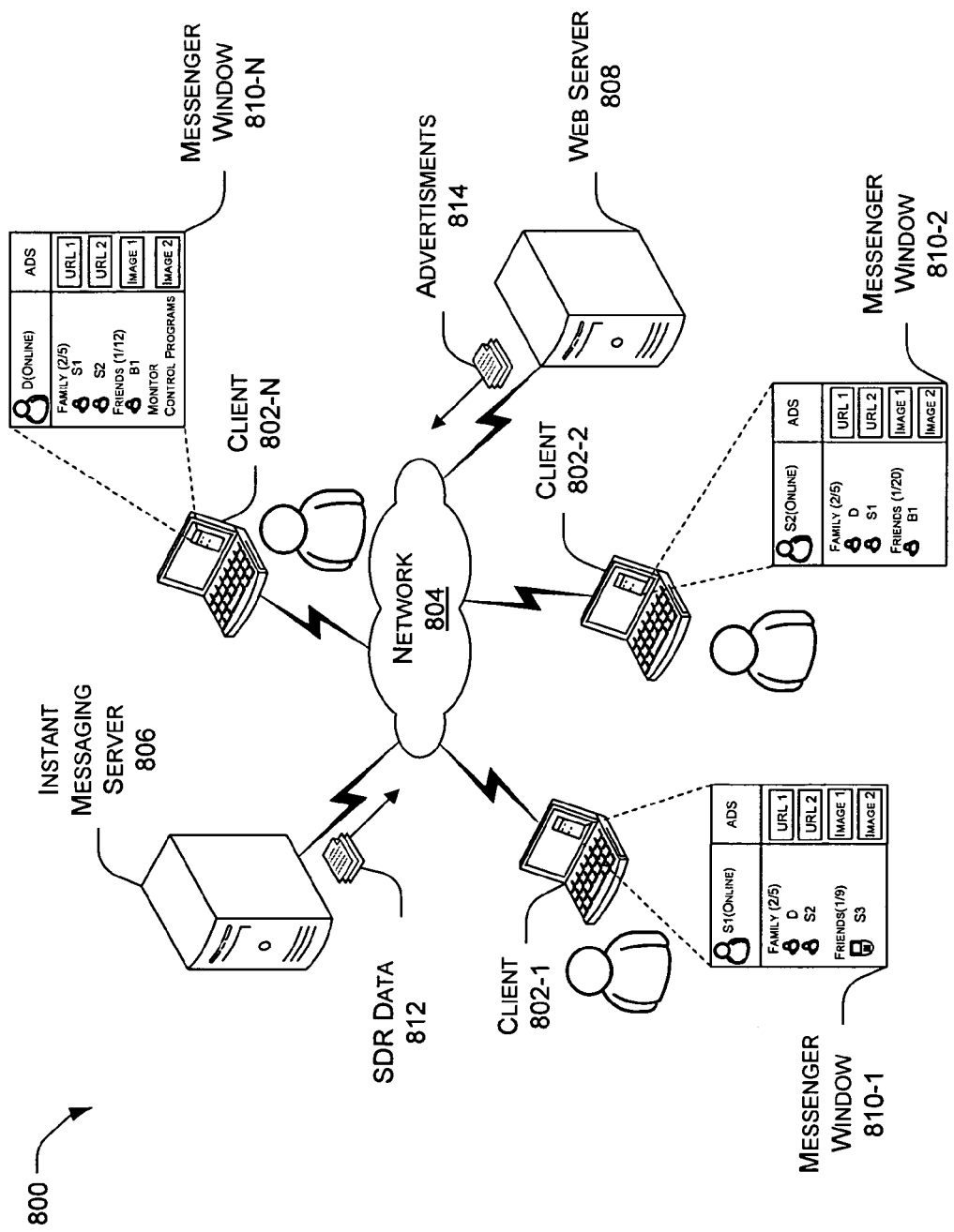
FIG. 8 illustrates an exemplary implementation of self-described rendering of advertisements.

FIG. 8 illustrates an exemplary implementation of self-described rendering of data such as advertisements through techniques described herein, and which may be representative, in whole or in part, of elements described herein. A computing environment 800, as illustrated is an example of a computing environment and is not intended to suggest any limitation to the scope of use and/or functionality of the computer and network architectures used.

The computing environment 800 includes a plurality of client devices 802-1, 802-2, 802-3, . . . , 802-N (collectively referred to as the clients 802), a network 804, instant messaging (IM) server 806, and a web server 808. The clients 802, instant messaging (IM) server 806 and the web server 808 are communicatively connected to each other through the network 804. The computing environment 800 may be implemented as broadly described above with respect to FIG. 1.

The web server 808 can be, for example, a general purpose computing device, a server, a cluster of servers, and mainframes. The web server 808 can be configured to receive one or more queries, such as web-based queries, from the one or more clients 802 over the network 804. The communication between the web server 808 and the clients 802 may be based on one or more of the known web-based communication protocols, such as HTTP. In one implementation, the web server 808 may be configured to manage and share one or more of web based applications or services, such as advertisements with the clients 802. Moreover, the clients 802 may communicate with each other through text-based messages using an instant messaging application.

In one embodiment, the web server 808 can be web server providing online purchase of goods/items. Websites associated with such web-servers advertise one or more different products that may be purchased by one or more clients visiting the website. Such sites offer various features that may allow clients to create a wish-list. The clients can include various consumer products that they desire to purchase in the wish-list. Depending on their need, or other considerations, a user may choose to purchase one or more products included in the wish-list. In one implementation, the wish-list created by a client may be stored on the web server 808.

As indicated previously, the additional information or extended information associated with any user, such as one of the clients 802, may be made available to other clients 802 who are known to the client, for example through a messenger window 810 in the IM application. In one implementation, the additional information may be the wish-list that may be created by one or more of the clients 802, and stored on the web server 808. For example, the additional information included in SDR data 812 is associated with the client 802-1 and indicative of one or more products that may be included in the client's 802-1 wish-list. The client 802-1 may also be willing to share his/her wish-list with other clients 802 such as the clients 802-2, 3, . . . , N.

As indicated previously, the SDR data 812 includes gadget data describing the wish-list of the client 802-1 and also includes rendering information for rendering and displaying gadget data. In one implementation, the web server 808 may instruct the IM server 806 to add the wish list as the gadget data of the SDR data 812.

The SDR data 812 associated with the client 802-1 can be made available to other clients 802 through the network 804. A module may extract the gadget data from the SDR data 812. In one implementation, a gadget creation module may either acquire the appropriate gadget(s) from an external source based on the gadget data or may create one or more gadget(s) based on the SDR data 812. The gadget(s) may render the gadget data based on a framework. A gadget rendering framework can provide a platform and various interfaces to render the gadget data using the gadget(s) in conformance with the rendering information included within the SDR data 812.

Rendering of the gadget data in the SDR data 812 allows the wish-list associated with the client 802-1 to be displayed to the other clients 802 through their respective messenger windows 810. This allows the clients 802 to view the wish-list associated with the client 802-1 without visiting the web site of the web server 808 hosting the online transaction service.

In one implementation, the gadget data of the SDR data 812 can include information associated with various advertisements such as advertisements 814 hosted by the web server 808. The information included in the gadget data can be rendered on the messenger windows 810 of the clients 802 based on the techniques described previously.

Figure 9:
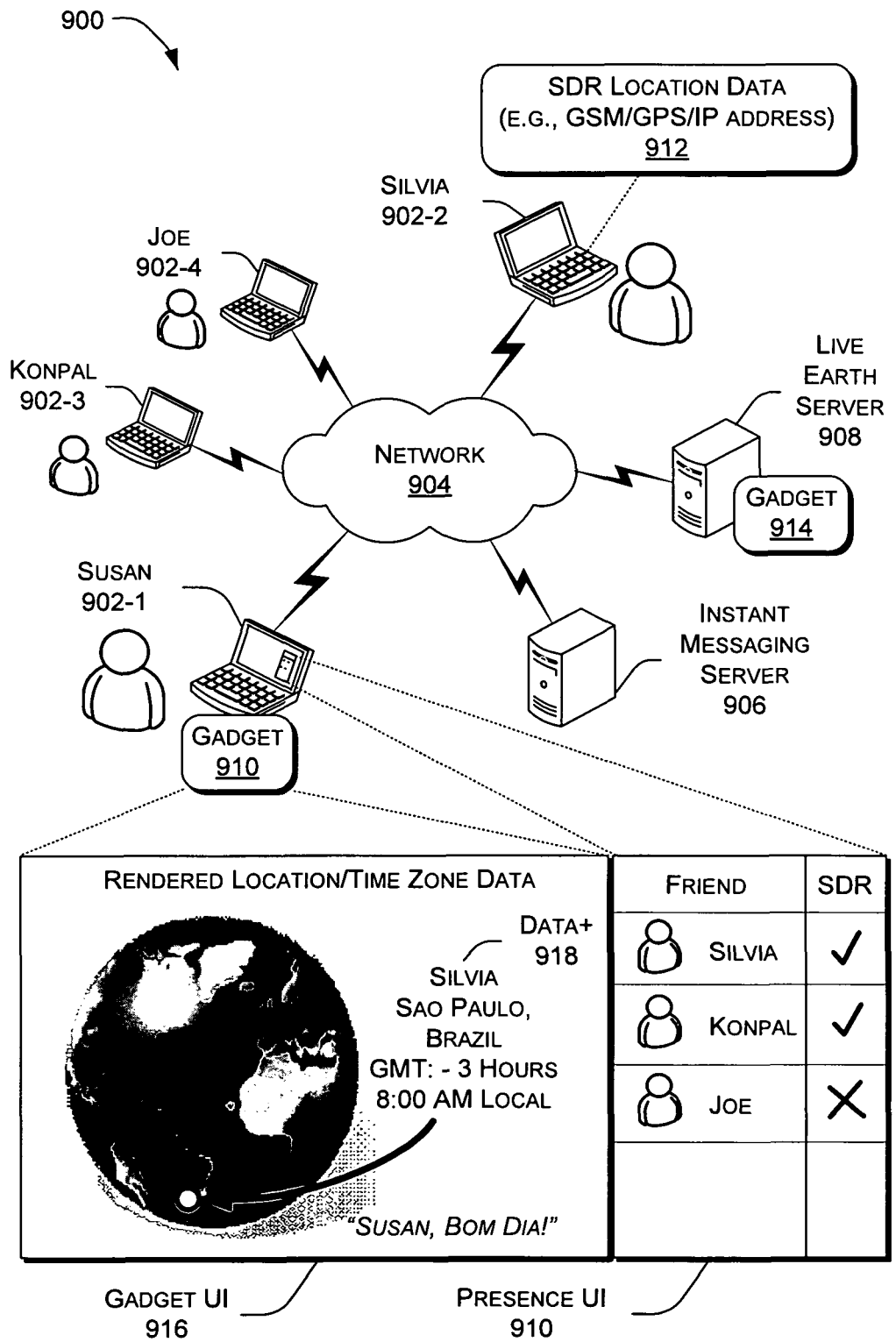
FIG. 9 illustrates an exemplary implementation of self-described rendering of geographical location.

FIG. 9 illustrates an exemplary implementation of self-described rendering of data in the form of geographical location of a user through one or more techniques described herein, and which may be representative, in whole or in part, of elements described herein. A computing environment 900 is an example of a computing environment and is not intended to suggest any limitation to the scope of use and/or functionality of the computer and network architectures used.

The computing environment 900 includes a plurality of client devices 902-1, 902-2, 902-3, and 902-4 (collectively referred to as the clients 902), a network 904, an IM server 906, and a location server 908. The clients 902 are communicatively connected through the network 904 via the IM server 906. The clients 902 may be connected with a location server 908. The computing environment 900 and each of its elements may be implemented as broadly described with respect to FIG. 1. The IM server 906 hosts an IM application allowing the clients 902 to communicate with each other using text-based messages.

The clients 902 communicate with each other when they are logged in and appear online. In one implementation, the clients 902-1, 902-2, 902-3, and 902-4 are referred to as users Susan, Silvia, Konpal, and Joe respectively. Each of the users Susan, Silvia, Konpal, and Joe can communicate with each other through one or more IM based applications and also view additional information related to each of the users. Examples of such additional information or extended information include but are not limited to geographical location like coordinates specifying the GSM or GPS or IP attributes associated with the respective clients 902, and so on. The presence of the clients 902 may be displayed in a graphical interface, say presence UI 910 in the IM application. For example, the presence UI 910 of user Susan indicates the presence status of other users namely Silvia, Konpal as online and Joe as offline.

The location server 908 can be, for example, a general purpose computing device, a server, a cluster of servers, and mainframes. The location server 908 manages and indicates geographical location and related details of one or more clients 902 to identify the location where the respective clients 902 may be located along with sharing the location information with the other clients 902.

In the example of FIG. 9, additional information, for example, a geographical description of a location associated with the user Silvia 902-2 can be shared as SDR location data 912 or SDR data 912 with other users Susan, Konpal and Joe. It may be appreciated that the current illustration can be presented from the perspective of other users. As indicated previously, the SDR data 912 includes the information associated with user Silvia 902-2 along with rendering information to render the associated information. The rendering information may provide details of one or more gadgets for rendering the gadget data associated with the user Silvia 902-2. In the example of FIG. 9, a gadget 914 available from a LIVE EARTH server 908 provides for rendering the associated information in the SDR data 912.

For sharing the additional information, users Susan, Konpal, and Joe receive the SDR data 912 associated with the user Silvia. As indicated previously a gadget creation module can acquire gadget data from the SDR data 912. The gadget creation module may either acquire the relevant gadget 914 from an external source such as for example, the location server 908 based on information included in the gadget data or may create gadget 914 based on the SDR data 912. The gadget 914 can render the gadget data using a rendering framework where the rendering framework provides a platform and various interfaces to render the gadget data using the gadget in conformance with the rendering information included within the SDR data 912.

Rendering of the gadget data generates relevant output (i.e., the geographical location associated with the user Silvia), which is displayed to other users through their respective gadget user interfaces 916. The gadget UI 916 may depict the presence in various visual forms. For example, the location may be depicted as a push pin on an animated globe depicting the geographical presence on Earth, or on a two dimensional surface like a route map, and the like. This may enable an online user to locate his/her friends, relatives, colleagues, and other acquaintances displayed on the gadget UI 916.

Figure 10:
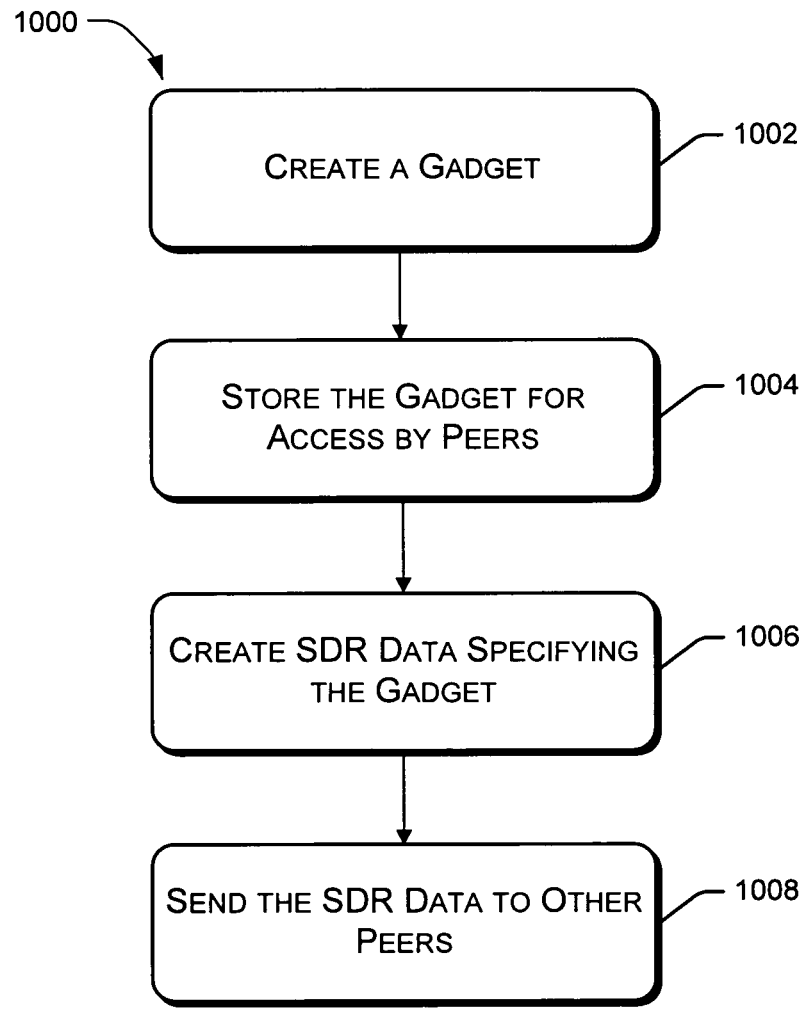
FIG. 10 illustrates an exemplary gadget creation process.

FIG. 10 illustrates an exemplary method 1000 for self-described rendering of data. In a creation block 1002, a gadget is created or otherwise located. In a storage block 1004, the gadget is stored for access by peers in a peer-to-peer network. Another creation block 1006 creates self-described rendering data that specifies the stored gadget as being capable of rendering some data about a peer in the peer-to-peer network. A send block 1008 sends the SDR data to peers in the peer-to-peer network.

Figure 11:
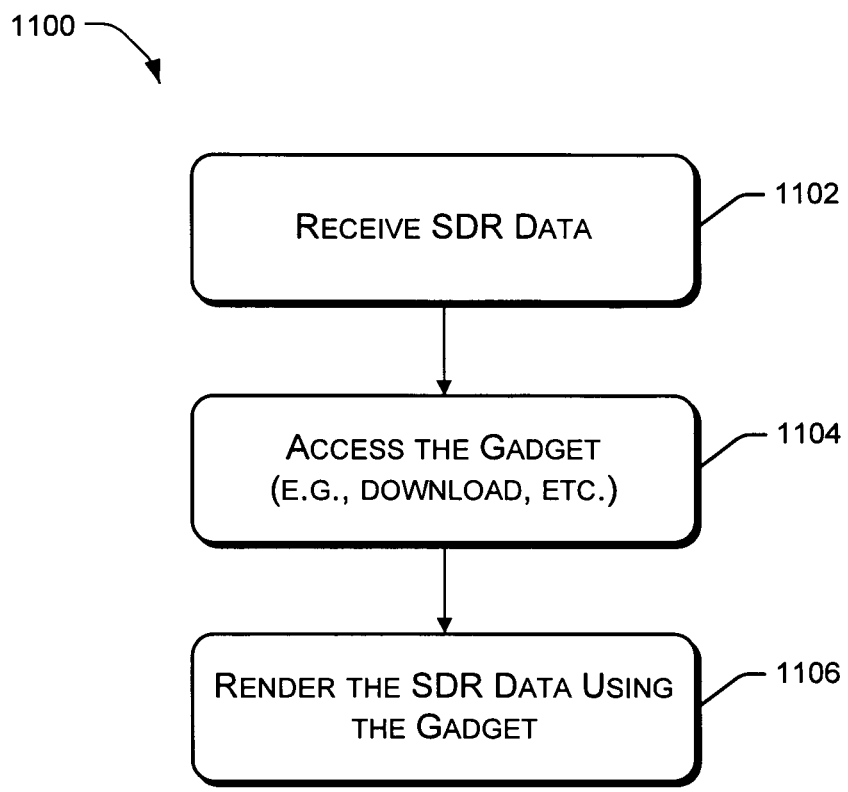
FIG. 11 illustrates an exemplary process for rendering user information using a gadget.

FIG. 11 illustrates an exemplary method 1100 for self-described rendering of data. The method 1100 commences in a reception block 1102 that receives self-described rendering data. This data includes some descriptive information and information about a gadget that can render the descriptive information. For example, the descriptive information may describe a location of a user connected to a network and the information about a gadget may indicate an address or domain name for accessing the gadget where the gadget is capable of rendering the descriptive information. Accordingly, the method 1100 includes an access block 1104 to access the gadget per the received SDR data and a render block 1106 to render the descriptive information in the received SDR data using the accessed gadget.

An exemplary method includes receiving data from a user of an instant messaging system, parsing the data to identify descriptive data about the user and to identify a location of a gadget, accessing the location of the gadget and downloading the gadget and executing the gadget to render the descriptive data. Such a method may include executing the gadget to visual renders the descriptive data and/or executing the gadget to audibly render the descriptive data. The descriptive data about the user may include information about an audio file or a video file.

Figure 12:
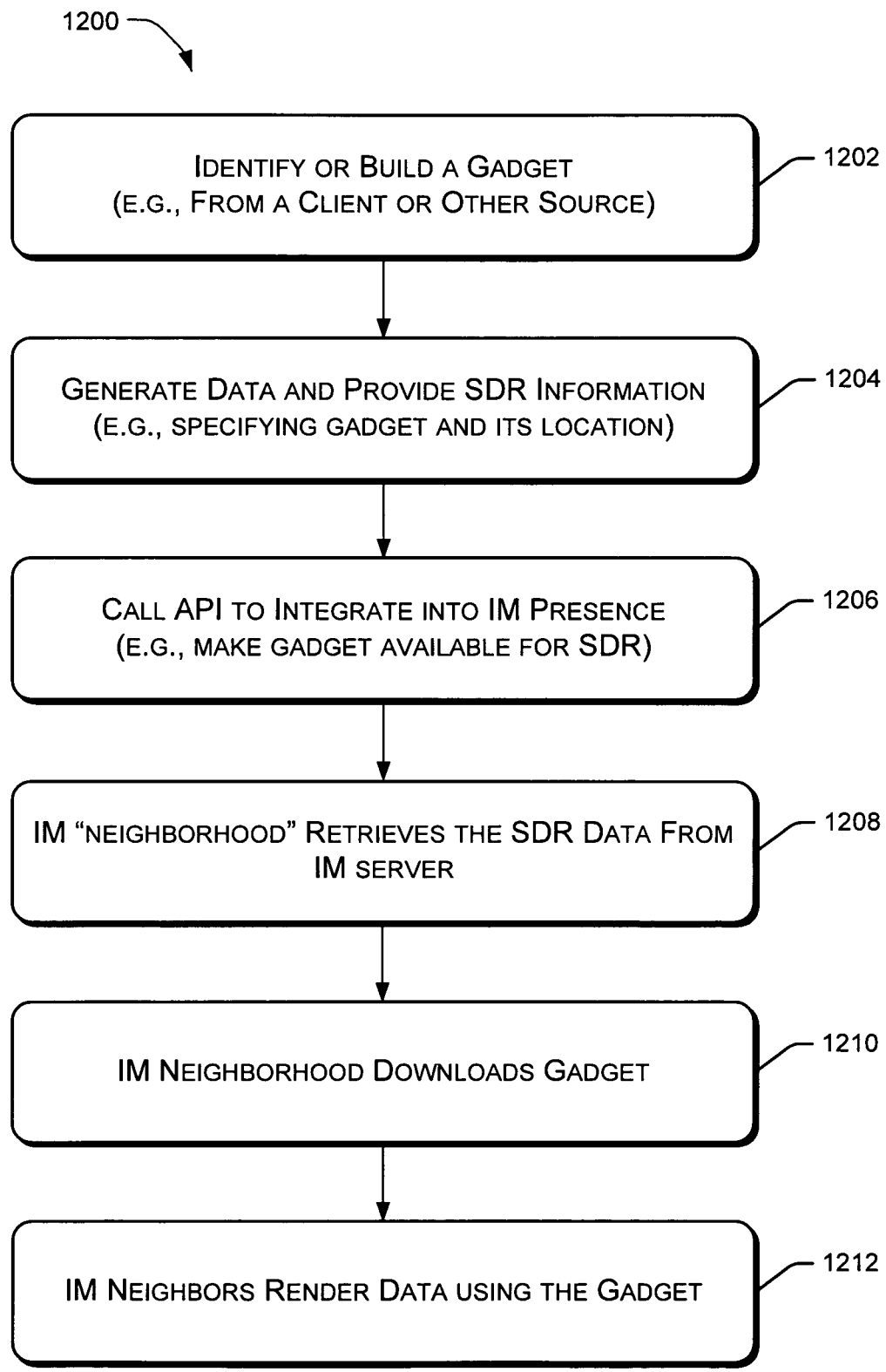
FIG. 12 illustrates an exemplary process for implementing self-described rendering of data.

FIG. 12 illustrates an exemplary method 1200 for self-described rendering of data. In an identification block 1202, a user in an IM environment identifies or builds a gadget. In a generation block 1204, the user generates data and provides SDR information that specifies the gadget as being capable of rendering the generated data. For example, the generated data may be location data generated by a GPS application executing on the user's computing device or it may be data generated by an Internet radio or video application executing on the user's computing device. Accordingly, the gadget may be a specialized 3rd party gadget for rendering such information or it may be a 2nd party gadget provided by the GPS application or the Internet radio or video application.

In a call block 1206, the method 1200 calls one or more APIs to integrate the SDR data into an IM system presence (e.g., to load or otherwise make available to an IM server). Once integrated, in a retrieval block 1208, contacts in an IM "neighborhood" can retrieve the SDR data from an appropriate source (e.g., an IM server). In turn, per a download block 1210, a contact's computing device parses the retrieved SDR data to uncover an instruction to access and download the appropriate gadget. A rendering block 1212 then renders the data using the downloaded gadget. Such rendering may make the data visible or audible to a contact in the IM environment.

An exemplary method includes generating descriptive data about a user of an instant messaging system, identifying a network location of a gadget configured to render the generated descriptive data and transmitting the descriptive data and the network location of the gadget to an instant messaging server of the instant messaging system. Such a method may further include accessing the instant messaging server and downloading the descriptive data and the network location of the gadget. Yet further, such a method may include downloading the gadget from the network location and executing the gadget to render the descriptive information. In various methods, descriptive data may be extended information that extends presence information of the user of an instant messaging system.

As mentioned, API calls may be used to implement of facilitate various aspects of self-described rendering of data. For example, a method may include calling one or more APIs to perform transmitting descriptive data and a network location of a gadget to an instant messaging server of an instant messaging system.

Exemplary Computing Device

Figure 13:
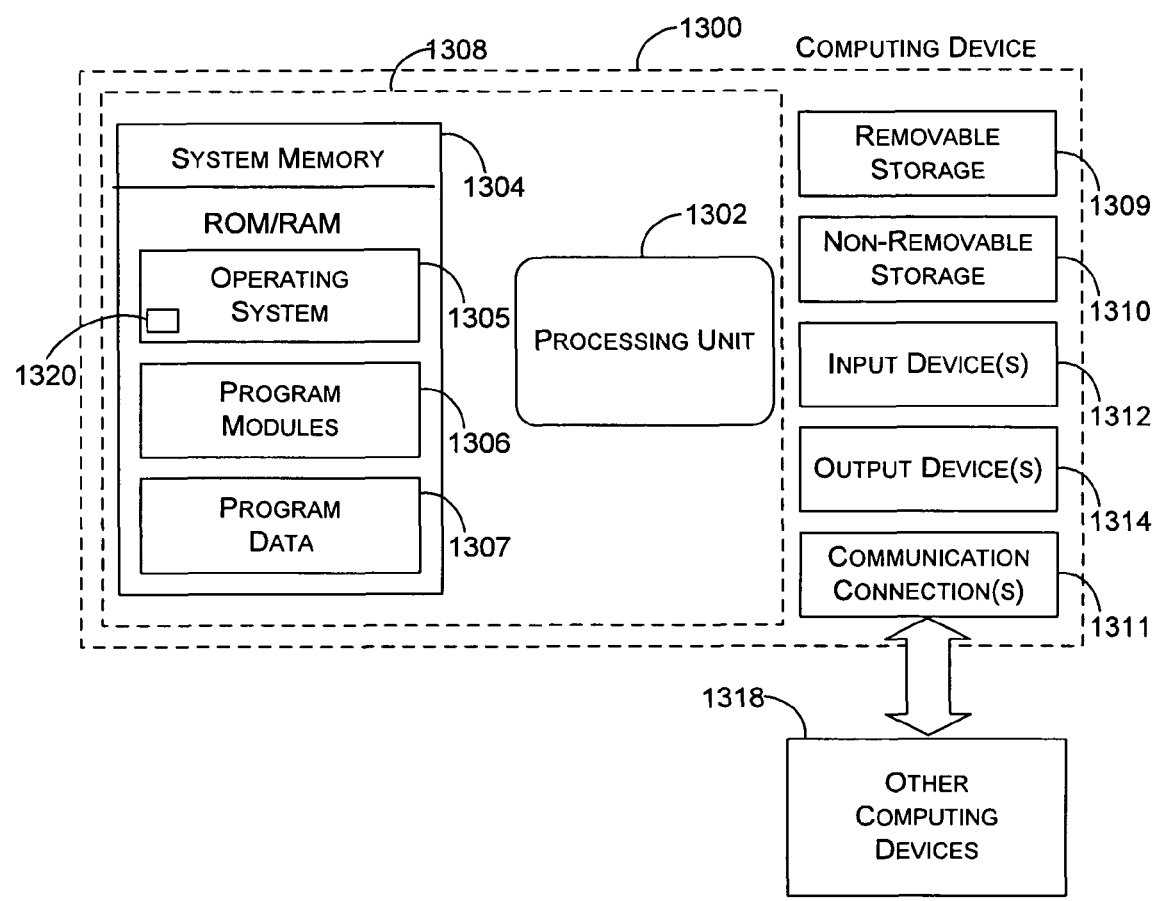
FIG. 13 illustrates an exemplary computing device.

FIG. 13 illustrates an exemplary computing device 1300 that may be used to implement various exemplary components and in forming an exemplary system. For example, the servers of the system of FIG. 1 may include various features of the device 1300.

In a very basic configuration, computing device 1300 typically includes at least one processing unit 1302 and system memory 1304. Depending on the exact configuration and type of computing device, system memory 1304 may be volatile (such as RAM), non-volatile (such as ROM, flash memory, etc.) or some combination of the two. System memory 1304 typically includes an operating system 1305, one or more program modules 1306, and may include program data 1307. The operating system 1305 include a component-based framework 1320 that supports components (including properties and events), objects, inheritance, polymorphism, reflection, and provides an object-oriented component-based application programming interface (API), such as that of the NET Framework manufactured by Microsoft Corporation, Redmond, Wash. The device 1300 is of a very basic configuration demarcated by a dashed line 1308. Again, a terminal may have fewer components but will interact with a computing device that may have such a basic configuration.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by removable storage 1309 and non-removable storage 1310. Computer storage media may include volatile and nonvolatile, removable and non-removable media implemented in any method or technology for storage of information, such as computer readable instructions, data structures, program modules, or other data. System memory 1304, removable storage 1309 and non-removable storage 1310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of device 1300. Computing device 1300 may also have input device(s) 1312 such as keyboard, mouse, pen, voice input device, touch input device, etc. Output device(s) 1314 such as a display, speakers, printer, etc. may also be included. These devices are well know in the art and need not be discussed at length here.

Computing device 1300 may also contain communication connections 1316 that allow the device to communicate with other computing devices 1318, such as over a network. Communication connections 1316 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network-based instant messaging system comprising:
a memory;
one or more processors operatively coupled to the memory and disposed within one or more devices; and
a data package accessible by the one or more processors further comprising:
descriptive data about a user of the instant messaging system; and
rendering data indicating a network location of a gadget to render the descriptive data and various attributes of one or more applications for displaying the descriptive data, wherein:
the network location is accessible by one or more other users of the instant messaging system;
the gadget includes an instructional code; and
the attributes include properties that identify a type of gadget for displaying the descriptive data on one or more devices of the one or more other users.

2. The network-based instant messaging system of claim 1 wherein the descriptive data and the rendering data are written in an extensible language.

3. The network-based instant messaging system of claim 1 wherein the data package comprises data to extend presence of a user of the instant messaging system.

4. The network-based instant messaging system of claim 1 wherein the descriptive data comprises geographical location data.

5. The network-based instant messaging system of claim 1 wherein the rendering data indicating a network location of the gadget comprises a URL.

6. The network-based instant messaging system of claim 1 wherein the rendering data indicating a network location of the gadget comprises at least one URL or a domain name associated with at least one URL.

7. The network-based instant messaging system of claim 1 wherein the rendering data indicating a network location of the gadget comprises an Internet Protocol address.

8. The network-based instant messaging system of claim 1 wherein the descriptive data about a user of the instant messaging system comprises data about merchandise.

9. The network-based instant messaging system of claim 1 wherein the rendering data indicating a network location of the gadget comprises a domain name or an Internet Protocol address of a merchandiser.

10. The network-based instant messaging system of claim 1 wherein the rendering data indicating a network location of the gadget comprises a domain name or an Internet Protocol address of an instant messaging server.

11. A method, implemented at least in part by a computing device, the method comprising:
receiving data from a user of an instant messaging system, wherein the data comprises descriptive data about the user of the instant messaging system and rendering data indicating a network location of a gadget to render the descriptive data and various attributes of one or more applications for displaying the descriptive data, wherein:
the network location is accessible by one or more other users of the instant messaging system;
the gadget includes an instructional code; and
the attributes include properties that identify a type of gadget for displaying the descriptive data on one or more devices of the one or more other users;
parsing the data to identify the descriptive data about the user and to identify the network location of the gadget from the rendering data;
accessing the network location of the gadget and downloading the gadget; and
executing the gadget to render the descriptive data.

12. The method of claim 11 wherein the executing the gadget visually renders the descriptive data.

13. The method of claim 11 wherein the executing the gadget audibly renders the descriptive data.

14. The method of claim 11 wherein the descriptive data about the user comprises geographical location data.

15. The method of claim 11 wherein the descriptive data about the user comprises information about an audio file or a video file.

16. A method, implemented at least in part by a computing device, the method comprising:
generating descriptive data about a user of an instant messaging system;
generating rendering data containing information for presenting the descriptive data on one or more computing devices of other users, the rendering data indicating a network location of a gadget to render the descriptive data and various attributes of one or more applications for displaying the descriptive data, wherein:
the network location is accessible by one or more other users of the instant messaging system;
the gadget includes an instructional code; and
the attributes include properties that identify a type of gadget for displaying the descriptive data on one or more devices of the one or more other users;
identifying the network location of a gadget from the rendering data configured to render the generated descriptive data; and
transmitting the descriptive data and the network location of the gadget to an instant messaging server of the instant messaging system.

17. The method of claim 16 further comprising:
accessing the instant messaging server; and
downloading the descriptive data and the network location of the gadget.

18. The method of claim 17 further comprising:
downloading the gadget from the network location; and
executing the gadget to render the descriptive information.

19. The method of claim 16 wherein the descriptive data comprises extended information that extends presence information of the user of the instant messaging system.

20. The method of claim 16 further comprising calling one or more application programming interfaces to perform the transmitting the descriptive data and the network location of the gadget to an instant messaging server of the instant messaging system.

* * * * *